June 12, 1962 G. VAN B. KING 3,039,080

ENCODING DEVICE

Filed July 27, 1956 3 Sheets-Sheet 1

INVENTOR.
Gordon van B. King
BY Joseph J. Kohler

June 12, 1962 G. VAN B. KING 3,039,080
ENCODING DEVICE
Filed July 27, 1956 3 Sheets-Sheet 2

INVENTOR.
GORDON VAN B. KING
BY Joseph J. Robbins
ATTORNEY

INVENTOR.
GORDON VAN B. KING
BY
Joseph J. Kohler [signature]
ATTORNEY

United States Patent Office 3,039,080
Patented June 12, 1962

3,039,080
ENCODING DEVICE

Gordon van B. King, Convent, N.J., assignor to Sperry Rand Corporation, New York, N.Y., a corporation of Delaware Filed July 27, 1956, Ser. No. 600,536
14 Claims. (Cl. 340—149)

This invention relates to analyzing means for sensing data on a record and producing related electrical signals, and particularly to analyzing means serving as a device to encode data symbols of various designs by producing time-sequence patterns of electrical signals in direct consequence of the scanning of the symbols, each distinct time-sequence signal pattern being codally representative of a different symbol.

Data analyzing devices include circuits controlled by mechanical, conductive, or ray energy sensing means for data units. A data analyzing device embodying a video camera type of device for encoding legible data symbols on a record by scanning the symbols with a pattern of ray energy and responsively producing time-sequence symbol encoding pulse patterns is utilized in the data processing system disclosed in my copending application Serial No. 335,944, filed February 9, 1953.

A problem common to data analyzing devices of all types is to maintain a correct relation between the data units and their sensing or scanning means. Misplaced relation between a data unit being scanned and the scanning means results in imperfect production of the signal or signals, or in off-timing of the pattern of signals with respect to a scanning cycle. Such misplaced relation and consequent deviation from normal of the output signals ordinarily result from malfunctioning of the feeding and handling apparatus for the data record and also, particularly where the data units are graphic symbols, from malfunctioning of the data recording means. To avoid misplaced relation, refined record handling and data recording means have been required, and even such refined means function inexactly after a time due to ordinary wear and tear. Therefore, it has been necessary heretofore to make allowance for misplaced scan relation, with the consequence of a reduction in permissible speed of the analyzing means and of a reduction in its perception of all the distinguishing characteristics among the different data units.

The invention provides a novel solution to the problem of misplaced scan relation, especially where the data to be scanned are composed of variously configurated symbols as, for example, conventional legible characters. One feature of the solution is the automatic sensing and correction of a misplaced scan relation in any direction, vertical or horizontal or in both coordinate directions. The solution has, as another feature, the automatic sensing and correction of a misplaced scan relation during thet scanning of each data unit. The invention utilizes signals resulting from early scanning of a data symbol to control evaluation and correction of a misplaced scan relation so that upon continued scanning of the symbol, an encoding signal pattern true and constant for the particular design of the symbol will be issued.

The invention contemplates, in the scanning of objects of various designs by a scan pattern of ray energy, the automatic adjustment of the field of view of the scan pattern to a predetermined positional relation with the design of an object under view. It is proposed to establish this relation by reference to the unique design of the object being viewed. More specifically, according to the invention, data symbols of various designs on a data record are encoded by a video camera the output of which will be used, at least in part, to control circuits for adjusting the scan pattern or raster to a fixed relation with the design of any symbol within the raster view, so that upon continued scanning of the symbol a predetermined pattern of encoding signals for the symbol design will be issued by the camera.

An object of the invention is to provide means for obtaining consistent, repeatable, time-sequences or electrical patterns of impulses, in which the impulses distinctive of the details of a symbol being scanned occur at fixed, repeatable, time intervals after the start of each scanning cycle with reference to the particular symbol design, without the need of separate means for accurate alinement of the symbol with the viewing medium of the encoding device.

The invention provides a device which will scan a data record bearing symbols and automatically aline, or center, its field of view upon any symbol which appears within this field; so that the number, character, and timing of the resulting electrical impulses are consistent and repeatable whenever the same symbol design is encountered and are not affected by slight misplacements of the symbols on the data record nor by slight misplacements of the record in its handling mechanism.

The invention especially applies to the use of a video camera or the like to scan symbols of various designs, drawn or printed or typewritten or recorded in any other manner on a data record. The symbols may be letters, digits, or other distinctive designs. The output signals produced by the camera during scanning consist of positive and negative voltages resulting from the differences in amounts of illumination received as the scanning beam strikes blank areas of the data record or relatively dark surfaces of the symbol. A portion of these output signals will be used to control centering of the scan pattern upon the symbol under scan.

According to the invention, the raster or scan pattern centering means will be controlled by output signals resulting from the scanning of contrasting areas of a symbol field by a raster of generally concentric orbits of ray energy; specifically by a spiral raster with revolutions approximating circles. Such raster provides for equal scanning frequency in coordinate vertical and horizontal directions and affords advantages brought out in the detailed description over the usual raster consisting of high frequency horizontal scans combined with low frequency vertical scan.

Either of two types of video cameras may be used in the inventive combination: (1) the type having a camera tube, such as an image orthicon, with fixed illumination of the field of view, or (2) the type generally known as a flying spot camera with a cathode ray tube providing spot illumination of the field of view in a scanning pattern and phototube means to receive the illumination as modulated by contrasting areas under view. The latter type of camera is preferred as more practical for dealing with data racords. Therefore, the disclosure is specific to the flying spot camera in the inventive combination, but it will be clear that the invention may be practiced with either of the camera types or their equivalents.

Objects and advantages besides those already indicated will appear from the subsequent description, the claims, and the drawings.

Figure 5:
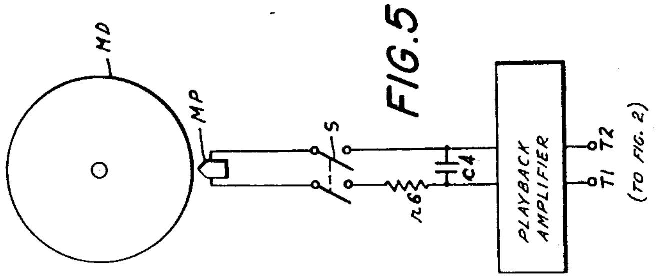

FIG. 5 diagrammatically shows a generator for this deflection control voltage.

Figure 6:
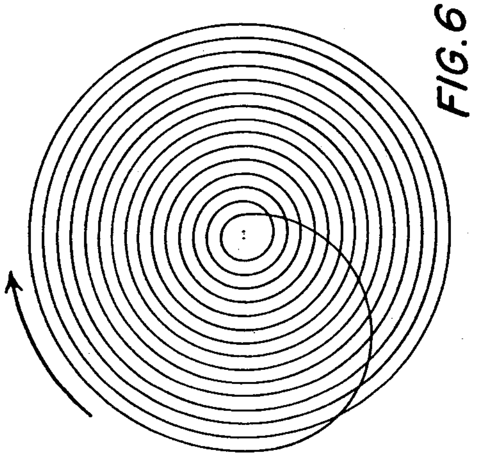

FIG. 6 shows the form of scan pattern or raster developed for scanning the field of view.

Figure 7:
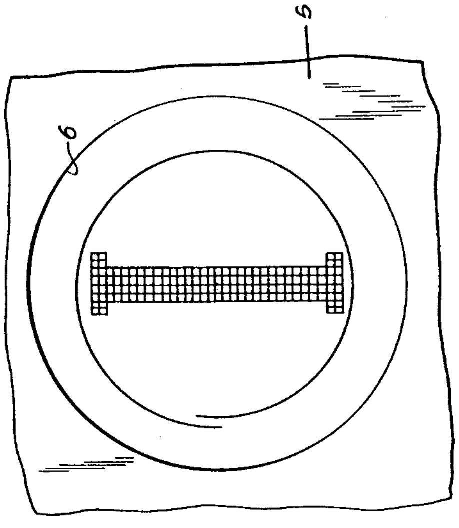

FIG. 7 indicates the raster outline focused on a symbol field of a data record.

*Brief Description*

Figures 1, 2:
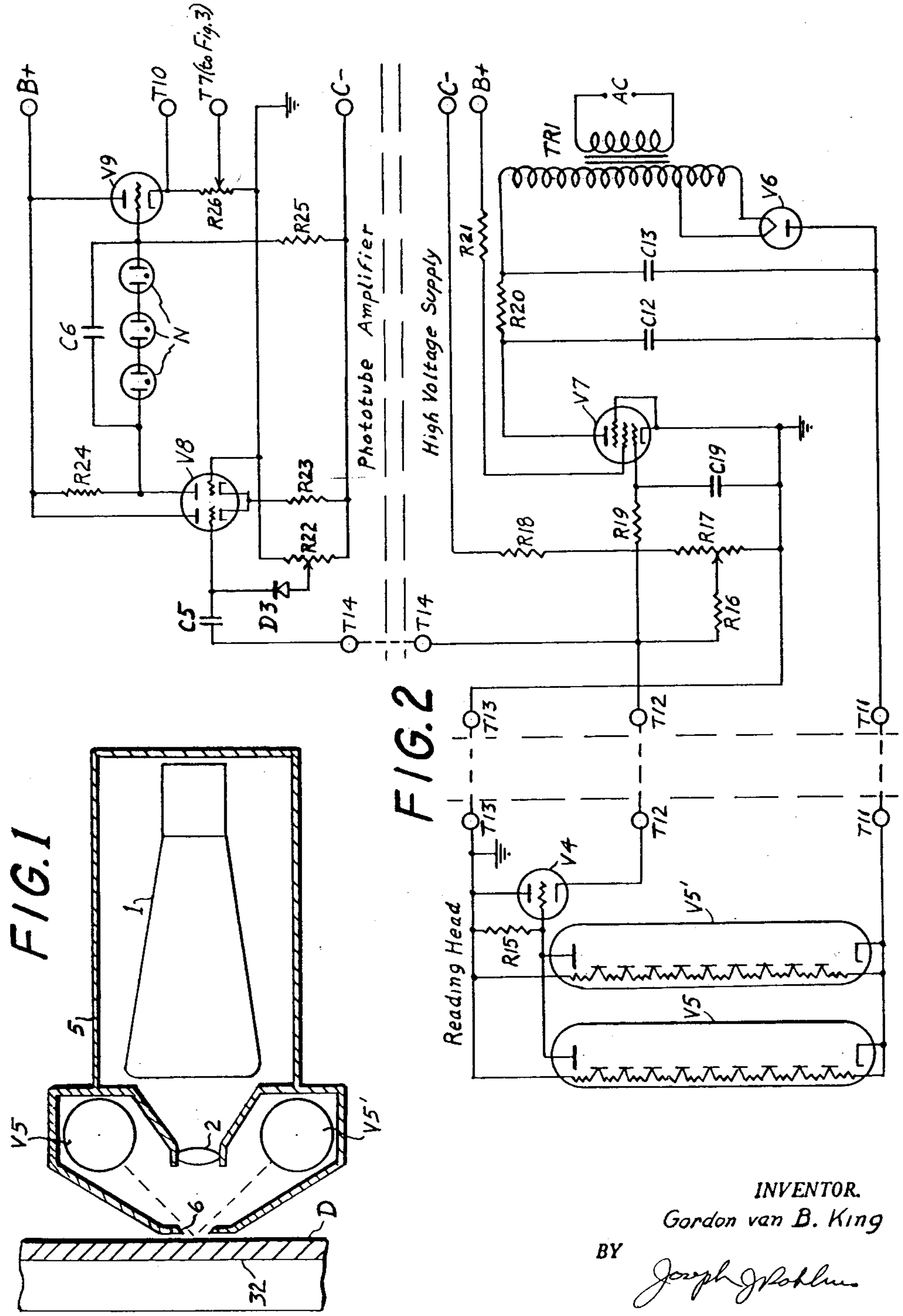
FIG. 1 is a schematic, sectional plan view of a typical arrangement of the flying spot camera for viewing a data record.
FIG. 2 is a circuit diagram of the phototubes, high voltage supply, and phototube amplifier.

Graphic data symbols along lines of a data record D (FIG. 1) are encoded, one after another, by a flying spot camera including a cathode ray or flying spot tube 1 and a pair of phototubes V5 and V5' (FIGS. 1 and 2). The scanning beam of ray energy provided by tube 1 is deflected in each scanning cycle through a spiral scanning raster (FIG. 6) under the influence of voltages applied to coordinate deflection means associated with tube 1. With this type of raster, the instantaneous voltages applied to the coordinate deflection means are directly proportional to and a measure of the radial distance from the raster center to the instantaneous position of the scanning spot. In terms of components, the instantaneous voltage on the horizontal deflection means is a measure of the horizontal distance of the scanning spot from the raster center, and the concurrent instantaneous voltage on the vertical deflection means is a measure of the vertical distance of the spot from the raster center. The positive and negative phases of the deflection voltages indicate whether the scanning spot is to the right or left and above or below the raster center.

The scanning raster is focused onto the data record and condensed to cover something more than the area of one symbol. The space between the flying spot tube and the record is enclosed to exclude light, although the enclosure need not be completely light-tight. Within the enclosure are two phototubes V5 and V5' so placed as to receive the light reflected from the scanning spot by the record. As a portion of the record is scanned by the flying spot, the phototubes receive more than average illumination when the spot strikes blank areas of the record portion and less than average illumination when the spot impinges on the darker areas of the symbol itself. The resulting electrical signals produced by the phototubes may be referred to as "light" and "dark" signals, respectively. The phototube output signals are amplified and shaped before being impressed on final output terminals T7 and T10 (FIG. 2). The ultimate use of the output signals is outside the scope of the present invention; they may be used for example in the data processing system disclosed in my aforementioned copending application. The subject invention makes auxiliary, immediate use of the signals on the output terminal T7 to correct any misplaced positional relation between the symbol being scanned and the scanning raster.

The "light" and "dark" signals forming the signal pattern issued by the encoding device during a scanning cycle have a time-sequence and durations depending on the arrangement and proportions of the blank areas and the symbol areas within the field of view of the scanning raster. The normal signal pattern for each particular symbol design is the one issued when a symbol of that design is in a prescribed position relative to the raster. If the symbol is misplaced, for instance to the left of correct position, a reduced proportion of blank area at the left of the symbol and an increased proportion of blank area at the right of the symbol are exposed to the view of the raster; hence the "light" signals resulting from scanning of the blank area at the left are of briefer than normal or correct durations for the symbol design while the "light" signals resulting from scanning of the blank area at the right are of greater than normal durations, and the time-sequence of both "light" and "dark" signals deviates from normal for the symbol design. Similarly, any other misplacement of the symbol results in deviation from the normal signal pattern for the symbol design. The correct position of the symbol is one where the symbol is centered within the field of view of the scanning raster. This position can be determined from the symbol design per se or from the related design of its background. It is preferred to establish the correct position of the symbol relative to the raster by reference to the symbol design itself; i.e. by reference to the dark areas of the symbol exposed to view.

A portion of the output of the encoding device is used to make the raster self-centering on any symbol within its field of view. In the specific embodiment, the "dark" signals in the output will be used to control the raster centering means. These signals will serve as control signals for two identical switching or clamping circuits. One clamping circuit will couple a vertical integrating network to the vertical deflection circuit to receive, upon the issue of each "dark" signal, a vertical deflection proportional voltage as a measure of the vertical distance from the raster center of the dark symbol area from which the signal is derived, and the other clamping circuit will concurrently enable a horizontal integrating network to receive a horizontal deflection proportional voltage from the horizontal deflection circuit as a measure of the horizontal distance of the dark area from the raster center. The voltages received by the integrating networks are positive or negative depending on whether the dark area is above or below and to the right or left of the raster center. The integrating networks thus accumulate during one or more raster cycles resultant positive or negative charges indicative of the balance of the dark areas about the raster center. The integrating networks, in turn, feed back into the associated deflection circuits to adjust the average levels of the vertical and horizontal deflection voltages, and thereby to adjust the raster unitarily up or down and to left or right as required to center the raster upon the symbol under view.

A specific description follows. It is understood that power supplies, amplifiers, and other conventional elements may be diagrammatically shown. Where dual triodes are used, the equivalent individual triodes may be used instead. For convenience, the left and right halves of dual triodes may be referred to, respectively, as the first and second units or sections and their electrodes referred to as the first and second electrodes, respectively.

*Mechanical Arrangement*

FIG. 1 is a schematic plan section of a suitable arrangement of units of the encoding device in relation to a data record D. As illustrative, it may be assumed that the data record bears ordinary typewritten matter composed of legible symbols recorded along successive lines. Preferably, the spacing between symbols along a line is greater than conventional and sufficient to separate each symbol and its background distinctly from the adjacent symbols and their backgrounds. Also, double line spacing preferably will be used. Any suitable record handling means may be used; for example, such means as shown in my aforementioned copending application and of which the record backing plate 32 is shown here.

The raster produced on the face of flying spot tube 1 is focused by a lens 2 onto the data record D, through an aperture 6 in an enclosure 5. The enclosure serves to prevent ambient illumination from reaching the portion of the record at aperture 6. Phototubes V5 and V5' receive the diffuse reflection of light from the portion of the data record being scanned by the flying spot of light from tube 1. Tube 1 is a cathode ray tube such as type 2BP11; the phototubes may be of multiplier type 931A. Aperture 6 exposes a single symbol field of the record to the scanning raster. One such field at a time will be placed in view at the aperture by the record handling means. The use of two phototubes, rather than one, is recommended in order to reduce the net effect of such variations in the amounts of reflected light received by the phototube means, as the flying spot moves through its scan pattern, which may be due to the changes in distance and angle of reflection between the phototube means and the point of incidence of the flying spot on the record. More than two phototubes could be used for still better pickup from all portions of the exposed field. Two have been found sufficient.

If a camera tube, such as a vidicon or image orthicon, were to be used, it would take the place of tube 1. V5 and V5' would be replaced by one or more sources of fixed illumination.

*Video Signal Circuits*

FIG. 2 shows schematically the circuits which may be used to produce and shape the output signal from phototubes V5 and V5'. These circuits are illustrative, solely, of a circuit system which will give satisfactory outputs from type 931A phototubes, under the arrangement and for the purposes herein described. Suitable circuits for use with the various types of camera tubes are available commercially. Regardless of the type of circuitry used to develop the output, it should terminate in a clipping circuit, such as includes tube V8, preferably followed by a cathode follower such as V9. These circuits will be described below.

Referring to the portion of FIG. 2 marked "Reading Head," the cathodes and dynodes of both V5 and V5' are supplied with a high negative voltage from terminal T11. The anodes of V5 and V5' are returned to ground through a load resistor R15. These anodes also connect to the grid of a cathode follower V4. Use of a follower tube is desirable so that the load resistor may be as large as possible, such as 2.2 megohms, to obtain the maximum output signal from the phototubes and to put minimum capacitative loading on the tubes, since fast response of the electrical signal to changes in illumination is required. The cathode of V4, which follows the signal, leads to terminal T12.

The sensitivity of 931A tubes varies widely between tubes. A closely matched pair should be used for V5 and V5'.

Referring now to the lower right portion of FIG. 2 marked "High Voltage Supply," T11 connects to the anode of half-wave rectifier tube V6 which develops a high negative voltage from the transformer TR1. Terminal T12 connects to a load resistor R16, across which V4 develops its output signal. R16 returns to the voltage divider circuit R17 and R18 receiving negative voltage from the C— supply. Potentiometer R17 should be set just sufficiently negative so that V4 is cut off when a blank data record is being scanned. This serves to eliminate from the output signal the spurious variations in phototube output caused by changes in the instantaneous position of the flying spot and by variations in the reflective qualities of the data record surface.

The terminal T12 also connects to the grid of a control tube V7, a high voltage pentode such as a 6BQ6, through a low-pass filter consisting of R19 and C19. V7 serves to control the voltage applied to the cathodes of the phototubes so as to compensate partially for signal variations due to changes in line voltage, in the intensity of the flying spot, and in sensitivity of the phototubes. The V7 anode connects to the positive end of the TR1 secondary through a smoothing filter consisting of R20, C12 and C13. Gradual variations of the D.C. level at T12, due to any of the above causes, will vary the potential drop between the anode and cathode of V7, thus changing the potential across the phototubes in a direction to compensate for the initial change. The low-pass filter R19 and C19 prevents the normal output signal from having any effect on V7.

The signal carrying line from T12 also goes to a terminal T14 connected through a coupling capacitor C5 to the first grid of a dual triode tube V8 in the phototube amplifier circuit. V8 is connected to act as a limiter, or clipper, which serves to standardize the amplitude of the photo signals. The amplitudes of the signals from V4 will vary widely due to variations in the density and line widths of the data symbols and due to variations in the effective sensitivity of the phototubes to light reflected from various portions of the symbol field. The circuit arrangement shown for V8 is particularly desirable because; first, large signals will not cause its first section to draw grid current which would affect the grid bias; and second, by proper setting of R22, small, unwanted signals below any desired minimum can be prevented from appearing in the output. A diode D3 serves as the customary diode, or D.C. restorer, such as must be used with any sort of video or transient signal. When the reading head is sensing a blank portion of the data record, no signal is received at T14; D3 keeps the first grid of V8 below cutoff potential, the cathodes of V8 are driven sufficiently in a negative direction to cause the second section to saturate, drawing the second section anode to its lowest possible potential level. The same condition occurs whenever a background area, around or within a data symbol, is being sensed. However, when any signal appears at T14 which is a few volts more positive than the set minimum, the first grid potential of V8 rises, the cathodes follow, the second section is cut off, and the second anode rises close to the B+ supply potential.

The output from V8 goes to cathode follower V9, to provide a low impedance output, and isolate all prior circuitry from external loading. Capacitative coupling between tubes, with a second diode restorer, could be used. The direct coupling shown is very satsifactory. Three neon tubes N, such as type NE2, in series, are used to lower the high D.C. level at the V8 second anode to only a few volts above ground, suitable for the grid of V9. The neon tubes are by-passed with C6, to transmit rapid signals. The grid of V9 is returned through R25 to the C— supply; so that there will be sufficient current flow through the neons to keep them ionized, even during the occurrence of prolonged blank, negative signals.

The final output of the entire encoding device is available at T10 for any desired subsequent use. The output, also appearing at T7, goes to raster centering circuits, shown in FIG. 3 and explained later. R26 provides means for setting the amplitude of the output signals at T7 to suit the requirements of the centering circuits. The output signals at T7 and T10 will have these characteristics: Whenever the flying spot is illuminating a blank or background area of the data record, the phototubes will draw maximum current, their anodes will hold the grid of V4 at a minimum potential level, the cathode of V4 will be drawn negative by current through its load resistor R16 from the C— supply, diode D3 will hold the first grid of V8 at its lowest potential, the second section of V8 will be saturated, and the cathode of V9 will hold at some minimum fixed potential level. On the other hand, whenever the flying spot impinges on the dark surface of some portion of a data symbol, the phototubes will draw less current, their anodes will rise in potential, this rise will be carried through V4 to V8, the V8 second anode will be cut off, and a fixed maximum potential will appear at T7 and T10. Due to the clipping action of V8, the rise and decay times of the signal will be quite short. Thus, the final output signals will consist of positive and negative pulses of fixed amplitude; the time of occurrence and the duration of the positive signal pulses will represent the arrangement and proportions of the data symbol being scanned.

*The Scanning Raster*

The scanning raster which the cathode ray beam of the flying spot tube 1 traces each scanning cycle on the face of the tube is preferably a decreasing spiral raster of the form shown in FIG. 6. This raster could have any number of revolutions; ten, fifteen or more, depending on the required scanning detail. The matter to be scanned here is, for example, typewritten matter for which a raster of fifteen revolutions affords adequate scanning detail. The projection of this raster upon the data record defines the field of view for a symbol and its background. Should an image orthicon or like type of tube be used, the projection of the symbol field would be scanned by the raster. The principles of the invention apply whether the scanning is done by the raster projection upon a symbol field or upon the symbol field projection by the raster. Accordingly, the term raster unless qualified will be understood to mean either the raster itself or the raster projection.

The raster is more than adequate in size to cover the largest symbol to be scanned and when centered on the symbol at least the outermost revolution of the raster will encircle the symbol with clearance, as indicated in FIFG. 7.

*The Deflection Control Voltage*

Figure 4:
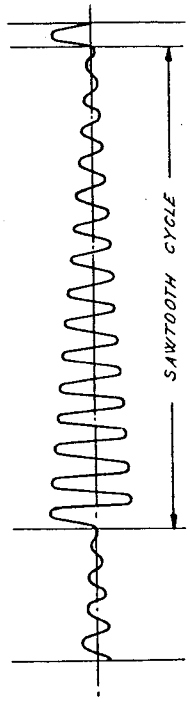
FIG. 4 shows the wave form of deflection control voltage used.

The raster is developed under the influence of coordinate deflection potentials derived from deflection control voltage of the form indicated in FIG. 4. As shown, there are fifteen sinusoidal waves of progressively declining amplitude in each deflection control cycle which is consistent in duration with a scanning cycle. Each wave of control voltage will lead to the production of one revolution of the spiral raster, in a manner explained in the next section of the description.

FIG. 5 is a schematic showing of means from which the deflection control voltage may be derived. MD designates a magnetic drum tracked with a magnetically recorded simulation of the pattern of deflection control voltage. MP designates the magnetic pickup head. Suitable means (not shown) are used to rotate the drum continuously. Upon closure of a switch S, the pattern on the drum as picked up by the head MP is applied to a conventional playback amplifier, the output of which supplies the deflection control voltage to terminals T1 and T2. Resistor *r6* and capacitor *c4* form a filter in the playback circuit to smooth the playback wave form and reduce any high frequency noise which may be produced by the drum during its rotation. Means for producing the magnetically recorded simulation of the pattern of deflection control voltage upon the drum MD is disclosed in my copending application Serial No. 567,236, filed February 23, 1956, and now U.S. Patent No. 2,857,553 of October 21, 1958.

*The Deflection Circuits*

Figure 3:
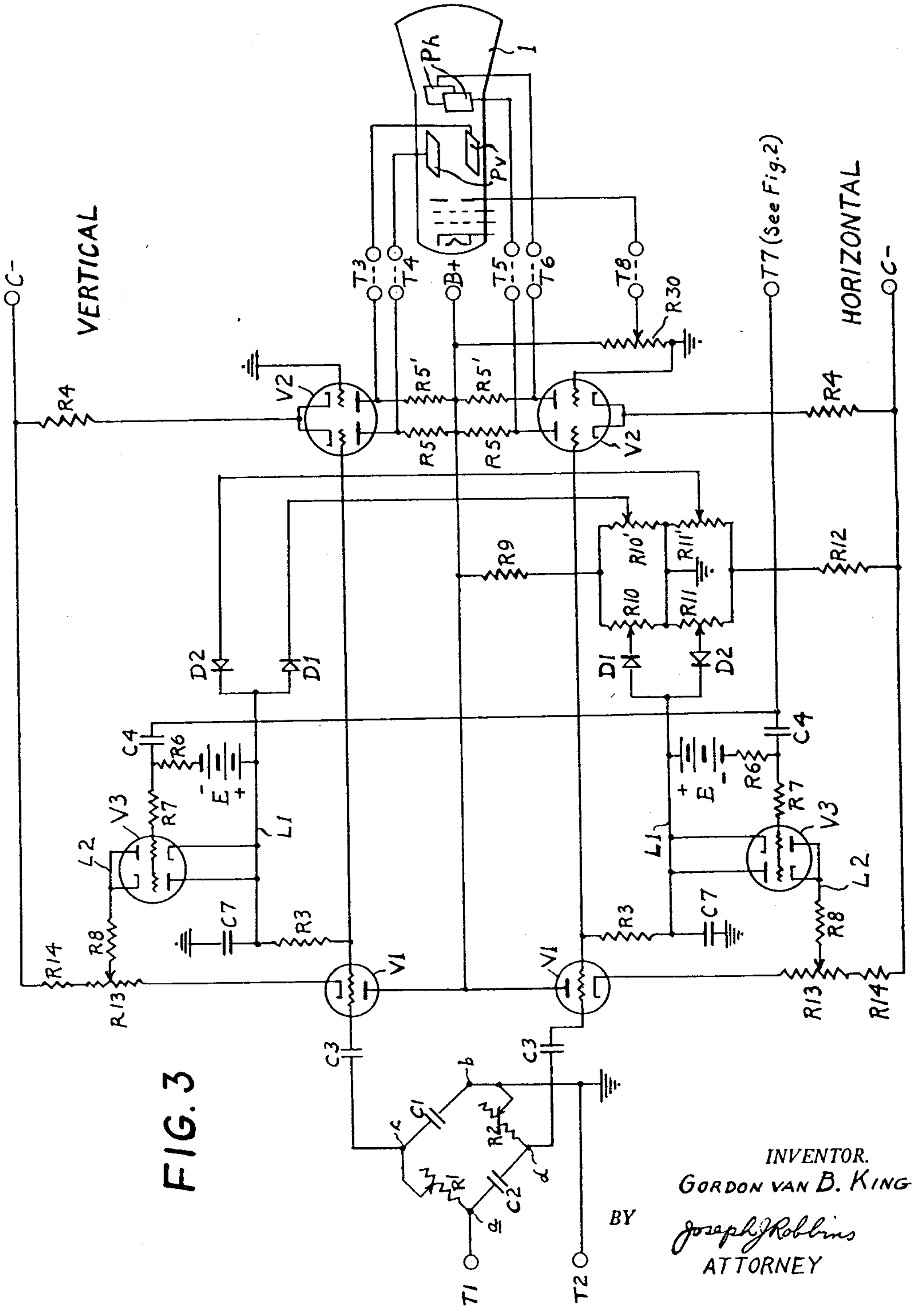
FIG. 3 is a circuit diagram of deflection means and the scan pattern or raster centering means.

T1 and T2 in FIG. 5 are suitably connected, respectively, to terminals T1 and T2 in FIG. 3. The deflection control voltages thus appear across the latter terminals to be applied after phase shifting to the deflection circuits in FIG. 3. T2 (FIG. 3) is grounded. The voltages at T1 (FIG. 3) with respect to ground are applied to input point *a* of a phase shifting network consisting of C1, C2, R1 and R2. Point *b* of the network is connected to ground. The resultant voltage appearing at point *c* of the network is shifted 45 degrees lagging with respect to point *a* by the action of R1 and C1. The voltage at point *d* of the network is phase-shifted 45 degrees leading with respect to point *a* by C2 and R2. Hence, the outputs at points *c* and *d* differ from each other by 90 degrees. R1 and R2 may be adjusted to make the outputs at *c* and *d* closely 90 degrees out of phase, with any desired relative amplitude between them.

The output from point *c* of the phase shifting network is used to control the voltages on one pair of deflection plates in the flying spot tube 1, say the vertical plates P*v*. The output from point *d* controls the other pair of plates, in this case the horizontal pair P*h*. Since the deflection sensitivity is not the same for both pairs of plates, R1 and R2 may be adjusted to compensate for the difference, or to produce an elliptic raster if desired.

From points *c* and *d* onward, the two deflection circuits are identical in every respect. Therefore, the same identifying symbols have been used for corresponding components in both circuits, in FIG. 3, and in the following description which applies to either circuit.

From points *c* and *d*, lines run through coupling capacitors C3 to the grids of tubes V1 and to the first grids of tubes V2. Each tube V2 is connected in a well-known manner to act as an amplifier and phase inverter. The second grid of each is grounded; inversion occurs in the resistors R4, connected from the C— supply to both cathodes of each tube. The first section cathode will follow the signal on the first grid; however, with only one-half the amplitude, since the first cathode is directly connected to the second cathode which is controlled by the grounded second grid. Therefore, the signal voltage between the first grid and first cathode is a half-amplitude one, in phase with the input signal. The signal voltage between the second cathode and second grid is also a half-amplitude one, 180° out of phase with the input. Consequently, the outputs from the anodes of each V2 are in push-pull relation. Push-pull voltages are desirable for driving deflection plates of a cathode ray tube to avoid distortion and de-focusing of the ray, which occurs with single-ended or unbalanced deflection drives. The balanced push-pull output is of further advantage in this invention, as will be clear. The V2 anodes connect via R5 and R5′ to the B+ voltage supply. Direct coupling is had between the V2 anodes of the vertical circuit and vertical deflection plates P*v* via terminals T3 and T4; the V2 anodes of the horizontal circuit are directly coupled via T5 and T6 to horizontal deflection plates P*h*.

The coordinate vertical and horizontal deflection voltages mirror the inputs received from points *c* and *d* of the phase shifting network, and thus consist of sinusoidal voltage waves progressively decreasing in amplitude each scanning cycle, with a phase difference of 90° between the vertical and horizontal pairs of voltages. These voltages, applied to the respective deflection plates of tube 1, cause its cathode ray beam and resulting trace on the tube face to have a rotary motion. Since the voltage amplitudes decrease progressively during each raster, the trace follows a decreasing spiral pattern, as indicated in FIG. 6. At the start of each raster cycle, the sinusoidal voltages are at their maximum amplitude and the trace describes the outermost path of the raster. As the sinusoidal amplitudes decrease, the coordinate deflections of the trace also decrease, until the trace approaches the center of the raster. Then, as the voltages return rapidly to maximum amplitudes at the end of the cycle, as shown in FIG. 4, the trace returns to the outer orbit of its spiral pattern.

*Raster Centering Means*

The raster as a unit is caused to center itself on a data symbol, within the limits of aperture 6 (FIGS. 1 and 7), by the action of means including tubes V1 and V3 (FIG. 3), tubes V3 being controlled by the video signal received from the terminal T7.

In a common-cathode inverter such as V2 where, as is the case here, the two sections of the tube have like parameters and equal load resistors R5 and R5′; the D.C. levels, or potentials relative to ground with no signal input, of the two anodes will be substantially equal when the D.C. levels of both grids are equal. In the present circuit, the second grid is grounded and the D.C. level of the first grid is normally and initially also at ground potential, so that the D.C. levels of the two anodes are then equal, and the raster produced in the flying spot tube is centered on the tube face, within manufacturing tolerances. Now, if the D.C. level of the first grid is raised above ground potential by a given amount, the D.C. potential level of the first anode will decrease, and that of the second anode will increase, by an amount approximately equal to the change in first grid level times the effective gain of the tube. Due to the inverting action of the tube, the effective gain at each anode will be about one-half the normal gain to be expected from a single tube with cathode resistor fully by-passed. Similarly, if the D.C. level of the first grid is lowered below ground, the D.C. level of the first anode will rise and the D.C. level of the second anode will drop. If the first grid level is varied at a slow rate, slow relative to the raster frequency, as will be the case here, the sinusoidal wave amplitudes produced at the anodes will not be affected, and flying spot tube 1 will continue to produce its decreasing spiral raster. However, the entire raster will move as a unit from center, up or down or to right or left, due to changes produced in the D.C. potential levels at the deflection electrodes; i.e., the deflection plates. The deflection plates are directly coupled to the V2 anodes since capacitative coupling would prevent the desired effect of the plates following the changes in D.C. levels of the V2 anodes.

Therefore, by varying the potential level of the first grid of each tube V2 in the correct direction, and under the control of the video signal from the phototubes, the raster can be caused to shift unitarily in the correct direction and by the correct amount to center itself upon any data symbol which appears entirely within the aperture 6. Tubes V1 and V3, with connected circuitry, operate to provide the desired variations in potential level of the first grid of each tube V2. Note that the first grid of V2 is returned through R3, not to ground, but to a line L1. The line L1 connects to ground through a relatively large capacitor C7 which serves to stabilize the potential of L1 relative to ground. Line L1 also connects to the first anode of V3 and the second cathode of the same tube. The first cathode and the second anode of V3 connect to a line L2 and thence through a resistor R8 to the load resistors R13 and R14 of V1. V1 is a cathode follower whose grid receives the same deflection input as V2. Therefore, the V1 cathode and the slider of potentiometer R13 follow the deflection input voltage variations, although at a decreased amplitude. The V1 cathode will always be at a higher potential level than the V1 grid. To compensate for this, R13 should be adjusted so that with the grid temporarily connected to ground, the line L2 is also at ground potential.

V3 may be described as a dual clamping tube and functions as a two-direction switch between lines L1 and L2. Each section of V3 is preferably a triode, as shown, with the lowest available plate resistance so that when its grid is at or near its cathode's potential, it forms a very low impedance path between lines L1 and L2. A 12AU7 is suitable for V3. The resistance of R3 should be high, one megohm or greater, so that the A.C. voltage coming through it will be largely dissipated in capacitor C7. Line L1 will thus have little or no A.C. voltage on it, but its potential will follow, within limits to be described, the variations in D.C. level at the V1 and V2 grids and, in turn, these grids will follow variations in the D.C. level of line L1.

Resistors R8, R13 and R14 should have relatively low impedance, say 100, 10, and 220 kilohms, respectively. A suggested value for C7 is 0.1 microfarad. Thus, whenever V3 conducts, a relatively large current will be able to flow to C7 and charge it either positively or negatively, depending on whether the voltage at that instant at L2 is positive or negative. It is seen that R8, a portion of R13, and C7 form an integrating network, in that the potential level at L1 will be roughly the integral of the instantaneous voltage amplitude in the deflection input lines times the duration of conduction in V3.

As previously mentioned, terminal T7 receives a portion of the output, video signal which is negative whenever the flying spot is scanning a blank or background area of the data record and is positive whenever a dark symbol area is being scanned. T7 connects through C4 to both grids of both tubes V3. During negative video signals, bias battery E, through R6, holds the V3 grids at sufficiently negative potential to hold V3 at cutoff, regardless of the negative or positive excursions of voltage on line L2. The potential level at line L1 then remains substantially constant and the flying spot raster holds a fairly fixed position. Whenever, on the other hand, a positive video signal is received at T7, of proper amplitude as set by R26 in FIG. 2, the V3 grids are rapidly driven to, or close to, cathode potential, and line L2 is clamped to line L1 through a very low impedance path. The resistor R7 serves to reduce the grid current which can be drawn during this state, so that there is little tendency to drive the cathodes positive. A suggested value for R7 is 100 kilohms.

An important characteristic of this circuit is the positive feedback which occurs whenever V3 conducts. For example, if the deflection input voltage happens to be negative to ground during a period of conduction, the resultant negative voltage on L2 draws L1 in a negative direction. Thereby, the grid of V1 is biased negatively, driving its cathode in a negative direction, by a lesser amount, so that L2 becomes more negative in turn. This feedback serves to compensate for the leakage which occurs through C7 and through a diode D1 or a diode D2 whenever L1 is at other than ground potential. For this reason, the raster can be driven to and maintained for several raster cycles in positions away from the center of the tube face. The circuit does not oscillate because the gain of V1 is less than unity, as in any cathode follower.

*Centering Limits*

The largest diameter of the raster spiral should be not more than 70 percent of the useful diameter of the tube face, so that the centering means can drive the raster off center of the tube face as much as 10 percent of the maximum diameter of the raster without having any portion thereof reach outside the useful face area. The centering means, however, in order to be capable of fast and complete centering action, has sufficient power to be able to drive portions of the raster entirely off the face of the flying spot tube, if permitted to do so. Should the centering means be allowed to drive the raster to such undesired position, illumination would be cut off from the phototubes during the interval that any portion of the raster was outside the useful face area of the flying spot tube; hence, the effect would be that during such interval prolonged "dark," positive video signals would issue. These "dark" signals would act through the centering means to drive the raster still farther out of position and to effectively lock it there. To avoid this, the invention provides means to limit the maximum up or down variations in voltage of line L1, without affecting any more than necessary the variations above or below ground potential inside the imposed limits. The voltage divider and diode network, consisting of R9, R10, R11, R12, D1 and D2, performs the limiting function for the horizontal deflection system; a like network including R10' and R11', in place of R10 and R11, and a second set of diodes D1 and D2 performs the same function for the vertical deflection system. By adjustment of potentiometer R10, the voltage on the cathode of D1 can be set at, say, 5 volts positive with respect to ground. So long as line L1 and the anode of D1 are at a less positive, or negative potential, there will be very little conduction through D1. If, however, the potential on L1 rises to or above 5 volts, D1 will form a low impedance path to R10, and thence to ground, preventing further rise in L1 potential. D2 is connected in reverse manner and will limit the negative excursions of line L1 to the voltage set on R11. Crystal diodes, indicated in FIG. 3, have proved satisfactory. High vacuum diodes may be used instead; their extremely high reverse impedances will permit freer excursions of potenital on L1 within the set limits, with less tendency to draw the raster toward the center of the tube face.

*Operation of the Raster Centering Means*

As described, whenever the flying spot is on any portion of a data symbol, a positive video output pulse appears at T7 in FIG. 2 and thence on connected T7 in FIG. 3. Here the pulse causes conduction of the tube V3 in each of the coordinate deflection circuits, whereupon a charging current flows through the integrating resistor R8 onto the integrating capacitor C7. The charge placed on C7 will have the same direction, positive or negative, and will be a small percentage of the deflection voltages existing during the time of issue of the active positive video pulse, approximately integrated through the pulse duration. For example, suppose that a negative deflection voltage on the grid of the vertical amplifier tube V2 causes the flying spot to move to the lower part of the tube face and that a positive deflection input voltage in the horizontal circuit causes the spot to move leftward and that in traversing the lower left portion of its raster, the spot impinges on some portion of a data symbol. The vertical integrating capacitor C7 will receive a slight negative charge, causing the spot to move slightly farther downward; the horizontal integrating capacitor will simultaneously receive a slight positive charge, causing the spot to move slightly farther to the left. The amounts of these respective charges will be proportional to vertical and horizontal coordinate distances of the spot from the center of the raster, since these distances are themselves determined by the momentary amplitudes of the same deflection input voltages which are, at the same moment, causing charges to flow onto the integrating capacitors. If the flying spot happens to be traversing the outer limits of the raster when the phototubes receive a "dark" signal, the capacitor charges will be relatively large; if the spot is close to the raster center, the charges will be proportionately smaller.

It was assumed that the vertical and horizontal integrating capacitors respectively received negative and positive charges as a result of a symbol area being sensed by the flying spot while at the lower left portion of its raster. In consequence, the spot was shifted downwardly and to the left. Next suppose that the flying spot, as it continues its pattern of travel, impinges on another symbol area diametrically opposite the first; hence, positive and negative charges will be applied to the vertical and horizontal integrating capacitors, canceling the initial charges, so that the spot will be moved upwardly and to the right and return to its original path. If it is assumed, however, that the spot does not encounter any more symbol areas after the first through the balance of the raster cycle, the initial charges will remain on the integrating capacitors. Therefore, the raster will have been moved bodily toward the lower left portion of the field. If the spot again crosses the same symbol area in the next raster cycle, the raster will be moved still farther downward and to the left, until after a few raster cycles, it has centered itself on the symbol, provided it does not reach the limits of motion set by R10, R11, R10′ and R11′.

Motion of the raster will cease when the positive and negative charges received by the integrating capacitors during a raster cycle exactly cancel each other; that is, when the algebraic sum of the charges applied to the vertical integrating capacitor and the algebraic sum of the charges applied to the horizontal integrating capacitor each become zero during a raster cycle. Within the time of a few raster cycles, the raster will adjust itself to a consistent, repeatable position centered on and unique to the particular design of the data symbol being scanned, and because of the positive feedback characteristics of the centering circuits, the raster will maintain itself in that position throughout many cycles. Any tendency of the raster to drift away from its centered position upon a symbol will be corrected by the continued automatic supervision of the centering circuits. If the symbol be moved slightly during scanning, the raster will follow the symbol motion, within the limits of raster travel, and settle itself in the same centered position as before. Since the raster sets itself, as described, to a unique centered position with respect to any given data symbol under view, the video signal output, at final output terminal T10 (FIG. 2), produced during the scanning of any given symbol within the limits of the field of view of the flying spot tube will be, after a few initial raster cycles, consistent and repeatable and truly definitive of the given symbol regardless of slight misplacements of the symbol within the field of view.

It is to be noted that each integrating network, composed of R8 and C7 and a portion of R13, has a time constant substantially longer than the raster cycle time and proportionately 15 times longer than the time of each of the 15 revolutions in the raster. Hence, during the time of one or more such revolutions within a raster, only extremely slight and gradual changes of the charge in an integrating capacitor C7 can occur, and if during a number of revolutions within the raster, or during an entire raster cycle, the flying spot traverses diametrically opposite and equal portions of a data symbol, charges of one polarity applied to either integrating capacitor will be canceled by equal charges of opposite polarity before any perceptible shift of the raster can occur in any direction. Satisfactory results have been obtained with a sinusoidal cycle frequency of 1800 per second, giving a raster cycle frequency of 120 per second. Other frequencies may also be used with satisfactory results.

The advantage of the spiral form of raster in which the trace orbits approximate circles becomes evident now. With this form of raster, scanning takes place at the same rate in component vertical and horizontal directions, so that the time constant of each integrating network has the same high ratio to scanning time in each direction. On the other hand, if the usual linear scanning raster were used with, say, 15 horizontal scans to each vertical framing scan, the time constant of the vertical network would be only $\frac{1}{15}$ as long relative to vertical scanning time as when the spiral raster is used. Therefore, the scanning of a dark portion, say above the raster center of the linear raster form, may result in an appreciable variation in the charge on the vertical integrating capacitor before being canceled by an equal charge resulting from scanning of a balancing dark portion below the raster center. Consequently, the raster would drift vertically unless the time constant of the vertical integrating network were considerably lengthened. But this, though feasible, would have the effect of making the vertical corrective action comparatively sluggish, and centering of the raster would take longer than is the case where the two coordinate integrating networks have the same short time constant, as permitted by the use of the spiral form of raster.

A concrete example will be given below. Assume, as before, that a negative deflection input voltage on the first grid of vertical amplifier tube V2 (FIG. 3) produces vertical deflection voltages causing the flying spot to travel below raster center; hence, a positive input voltage causes travel above raster center. Also assume that a positive input to horizontal tube V2 causes travel of the spot to the left of raster center, while a negative input causes travel to the right of center. Suppose now that the letter I is presented at aperture 6 (see FIG. 7) and is on center horizontally but off center vertically; i.e., above correct line position, with a preponderant portion above raster center. During one or more of the first revolutions of the scanning spot, it therefore crosses dark areas of the upper end of letter I and misses such portions of the lower end of the letter. Hence, "dark" signals issue while the vertical deflection input voltage is positive and at high amplitude. These signals close a circuit through vertical tube V3 between the cathode of the vertical tube V1 and the vertical integrating capacitor C7. During each "dark" signal interval, a vertical deflection-proportional voltage, positive in this example, is passed to this C7 and it accumulates a positive charge which is roughly the integral of the applied voltage amplitude times the "dark" signal duration. During the same first few outer revolutions of the scanning trace, "dark" signals do not issue while the vertical deflection input voltage is negative; hence, no counteracting negative charge is applied to vertical C7. As the raster spirals inwardly during each scanning cycle, the trace crosses dark areas of the letter I above and below the raster center and "dark" signals issue while the vertical deflection input voltages are alternately positive and negative and of equal amplitudes. Because of the relatively long time constant of the integrating networks, the resulting positive and negative charges placed on vertical C7 cancel each other before they can have any appreciable individual effects. This capacitor thus remains with a net positive charge accumulated during the first few outer revolutions of the scanning trace. This charge starts raising the D.C. level of the first grid of vertical V2, causing the trace to move upwardly. During a number of revolutions depending on the extent to which the letter I is above correct line position, the positive charge in vertical C7 has reached a magnitude sufficient to cause the raster to center itself in vertical direction on the letter I. The "dark" signals resulting from scanning of the letter thereafter cause equal but opposite charges to be applied each raster cycle to vertical C7; these charges cancel out, the capacitor retains the positive charge previously accumulated, and the raster remains vertically centered on the letter.

It was assumed that the letter I was initially on center horizontally. Therefore, the horizontal deflection-proportional voltage is zero, or nearly so, at the instants when the trace intercepts the symbol, and no corrective voltage is developed in the horizontal integrating network. If the letter I, or any other symbol, is initially not centered horizontally within the raster view, the horizontal integrating network, in the same way as explained for the vertical network, will develop a corrective voltage to shift the raster right or left, as required for centering the raster horizontally on the symbol. If a symbol be initially misplaced both vertically and horizontally, both integrating networks will simultaneously develop corrective voltages, causing the raster to shift in coordinate directions until centered in all directions upon the symbol.

In FIG. 3, terminal T8 connects the final anode of tube 1 to the slider of a potentiometer R30. R30 is an astigmatism control for setting the potential level of the final anode of tube 1 at the average level of the deflection plates; so that the trace will be sharp, of minimum size, in all parts of the raster. The sources of voltages for the electrodes of tube 1 other than the final anode and the deflection plates are conventional and need not be shown.

The B+ line in the circuits is impressed with potential in the order of 300 volts positive from a well-regulated source and the C— voltage is in the order of —250 volts. Other B+ and C— voltages may be used, those mentioned being typical. With regard to the V2 type of inverter, formulas for gain and relationship between anode and cathode resistors may be found in, for example, "Electronics" by Elmore and Sands, published by McGraw-Hill.

The disclosure has dealt specifically with a flying spot tube having electrostatic deflection plates. The principles of the invention are equally applicable to tubes having magnetic deflection, either the flying spot tubes or camera tubes such as an image orthicon. The circuits required to adapt those shown and described here to magnetic deflection will be obvious to those skilled in the art. The disclosure also has dealt specifically with centering of the raster under control of the "dark" portion of the camera output. Centering may be effected, if desired, under control of the "light" portion of the output. For instance, the symbol may be recorded in white ink on a dark surfaced record sheet or appear white against a dark background as would be the case if the record were a photostat negative. The "light" signals resulting from scanning of the white symbol areas could then take the place of the "dark" signals in controlling the centering means. To do this, it would simply be necessary to invert the output at T7 (FIG. 2) of the phototube amplifier, in a conventional manner, before being applied to the input terminal T7 (FIG. 3) of the centering means. It is also possible to record the symbols by a photographic process on a film negative so that they would be transparent or translucent, while the background areas would be relatively opaque. The phototube means would then be located at the opposite side of the film from the flying spot tube to receive more illumination through the symbol areas than through the background areas. Centering could then be effected, as in the preceding case, under the control of the "light" video signal output.

While there have been shown and described and pointed out the fundamental novel features of the invention as applied to a preferred embodiment, various omissions and substitutions and changes in the form and details of the device illustrated and in its operation may be made by those skilled in the art, without departing from the spirit of the invention. It is the intention, therefore, to be limited only as indicated by the following claims. In the claims, the term "raster," unless qualified refers to the cyclic scan pattern of energy provided by the video camera whether of the flying spot type or the image scanning type such as the iconoscope or the image orthicon or the equivalent; the expression "cathode ray beaming tube" or the like is understood to be generic to the camera tube whether of the flying spot type or the image scanning type exemplified by an iconoscope or an image orthicon or the equivalent; and the matter referred to as sensed or scanned for encoding is understood to apply to matter directly sensed or scanned by rays projected from the tube or to matter as imaged or presented on the face or screen of the tube.

I claim:

1. The combination with a data analyzer for data on a record and providing an electron beam scan field including a universally positionable sensing means for sensing coordinately arranged elements of the data and means coacting with said sensing means for producing a scan positioning electrical output, of an electrical system including vertical and horizontal positioning circuits for the sensing means controllable by said electrical output to adjust the sensing means in coordinate directions to a required sensing position.

2. The combination with an analyzer for data on a record and comprising a video camera providing a cyclically recurring flying spot raster for sensing distinguishing characteristics of the data and coacting phototube means for producing a related data representing video output, of an electrical angularly coordinate raster-positioning system controllable by said data representing output for adjusting the flying spot raster in coordinate directions angular to each other to a required sensing position relative to the data being scanned to enable the production by said phototube means of a true, consistent data representing output in response to continued sensing of the data by said flying spot raster during further cycling of the raster.

3. A device to encode data symbols of various designs, comprising a cathode ray beaming tube, coordinate deflection means operating the beam through a cyclic scan pattern for scanning design distinguishing areas of one symbol at a time, circuit means responsive to the scanning of a symbol for producing a related symbol encoding pattern of electrical signals, and scan pattern positioning means operatively connected between said circuit means and said deflection means to be controlled by said pattern of signals according to the proportional distribution of said areas of the symbol about the scan pattern center in angularly coordinate directions for acting through the first named means to adjust the scan pattern in angularly coordinate directions to centered scanning relation with the design of the symbol being scanned to provide for production by said circuit means of a consistent symbol encoding signal pattern in response to continued scanning of the symbol by the same aforesaid scan pattern.

4. A device to encode data symbols of various designs, comprising a cathode ray beaming tube, means supplying deflection voltages, a deflection system associated with the tube and responsive to the deflection voltages for directing the cathode ray beam through a cyclic spiral scanning raster for scanning successive design distinguishing areas of one symbol at a time, circuit means responsive to the scanning operation, and electrical means controlled by said circuit means to evaluate the proportional distribution of said areas in coordinate directions about the raster center for regulating the deflection voltages to shift the raster in coordinate directions to centered position relate to the design of the symbol under scan.

5. A device to encode data symbols of various designs, comprising a cathode ray beaming tube, coordinate vertical and horizontal deflection circuits, corresponding coordinate deflection means respectively activated by vertival and horizontal deflection voltages from the deflection circuits for driving the cathode ray beam through a cyclic scanning raster for the scanning of coordinately arranged elements of one symbol at a time, circuit means responsive to the scanning of said elements of a symbol for producing a related video output, and a pair of electrical systems, under common control of signals within said video output, respectively associated with the vertical and horizontal deflection circuits for adjusting them according to the vertical and horizontal relations of the scanned elements of the symbol about the raster center to vary the vertical and horizontal deflection voltage levels so as to shift the raster unitarily into centered scanning relation to the symbol being scanned.

6. An encoding device as defined in claim 5, including circuits respectively connected with said electrical systems for limiting their adjustments of the associated deflection circuits to prevent excess variation of the deflection voltage levels and over-shifting of the raster in any direction.

7. An encoding device as defined in claim 5, said electrical systems including capacitative networks commonly rendered effective by said signals to be charged, under the influence of deflection-proportional voltages in the associated deflection circuits, in accordance with the positional relation of the raster to the symbol under scan, and said systems further including connections between the capacitative networks and the associated deflection circuits through which the networks are effective according to their charges for adjusting the deflection voltage levels to shift the raster unitarily into a centered relation to the symbol under scan.

8. An encoding device as defined in claim 7, in which the symbols appear in symbol fields of a data record, the scanning raster covering a symbol per se and its contrasting background within a symbol field, said video output consisting of video signals of one polarity resulting from the scanning of symbol areas and of video signals of relatively opposite polarity resulting from scanning of the background areas, and switching means between the capacitative networks and the associated deflection circuits operated only by video signals of one said polarity for rendering the networks effective to be charged by the deflection-proportional voltages present in the associated deflection circuits during the occurrence of the latter kind of signals.

9. The encoding device as defined in claim 8, and settable circuits respectively connected to the capacitative networks to drain them of excess charges tending to produce excessive deflection voltage level adjustments and consequent shifts of the raster beyond limit positions.

10. An encoding device for symbols of various designs on a record, comprising a cathode ray beaming tube, coordinate deflection means for the tube, coordinate deflection circuits respectively supplying the deflection means with coordinate deflection voltage wave trains, each having positive and negative alternations with respect to a base voltage level, the deflection means being activated by the deflection voltages to drive the cathode ray beam through a scanning raster for scanning one symbol field at a time for contrasting symbol and background areas, means responsive to the scanning operation for issuing a time-sequence pattern of signals indicative of symbol areas being scanned and of signals indicative of background areas being scanned, a pair of electrical integrating networks respectively related to the coordinate deflection circuits, means controlled solely by the symbol-indicative signals for operating the networks, under the influence of positive and negative deflection-proportional voltages from the related deflection circuits occurring during issue of the latter signals, to algebraically integrate the proportions of symbol areas in coordinate directions about the raster center, and connections between the integrating networks and related deflection circuits through which the networks serve according to their integrations to adjust the base voltage levels of the deflection voltage wave trains so as to produce unitary shift of the raster to centered relation with the symbol under scan.

11. A device to encode data symbols of various designs, comprising a cathode ray beaming tube, associated vertical and horizontal deflecting means for the cathode ray beam, vertical and horizontal deflection circuits respectively supplying the vertical and horizontal deflecting means with sinusoidal deflection voltage waves of varying amplitude during a scanning cycle, those supplied to the vertical deflecting means being 90 degrees out of phase with those supplied to the horizontal deflecting means, whereby the coordintae deflecting means drive the cathode ray beam during each scanning cycle through a raster of substantially concentric revolutions for scanning one symbol at a time, circuit means responsive to the scanning of symbol areas for producing video output pulses, vertical and horizontal capacitative networks respectively related to the vertical and horizontal deflection circuits, means controlled by said pulses for enabling the networks to be charged positively or negatively under the influence of relatively positive or negative deflection-proportional voltages applied by the related deflection circuits during the pulse times, the vertical and horizontal networks thereby algebraically accumulating, during one or more scanning cycles, charges respectively indicative of the vertical balance and horizontal balance of the symbol areas about the raster center, and operative connections between the networks and the related deflection circuits through which the networks serve in accordance with their respective charges to adjust the average levels of the coordinate deflection voltages so as to effect shifting of the raster unitarily in one or both coordinate directions into substantially centered relation to the symbol being scanned.

12. A device to encode symbols of various designs on a data record, comprising a cathode ray beaming tube, coordinate deflecting means activated by coordinate deflection voltage wave forms to drive the cathode ray beam through a cyclic raster for scanning coordinately arranged design distinguishing portions of one symbol at a time, coordinate amplifiers respectively responsive to coordinate deflection input voltage wave forms for developing in their outputs the coordinate deflection voltage wave forms and applying them to the deflecting means, circuit means responsive to the scanning of said coordinately arranged portions of a symbol for producing a related symbol encoding video pattern of output signals, coordinate electrical networks continually effective under control of output signals within the video pattern for developing control potentials respectively indicative of deviations in coordinate directions of the raster from a centered positional relation to the symbol under scan, and connections through which these control potentials are impressed on the coordinate amplifiers to adjust the average levels of the coordinate deflection voltage wave forms developed thereby, so as to shift the raster in one or both coordinate directions to correct said deviations to enable a predetermined, consistent encoding video pattern of output signals for the symbol being scanned to be produced by said circuit means in response to continued scanning of the symbol by said raster during its continued cycling.

13. The encoding device as defined in claim 12, said amplifiers involving grid-controlled electron tubes, grid input lines through which the input voltage wave forms are applied to the electron tubes, said connections being from said electrical networks to the grid input lines to vary their D.C. potential levels in accordance with the control potentials developed by the networks.

14. A device to encode symbols of various designs, comprising a video camera with deflectable symbol scanning means, coordinate deflection means directing the scanning means in a cyclic scan pattern to sense angularly coordinate design identifying sections of one symbol at a time, signaling means responsive to such scanning of a symbol by said scan pattern for producing an output pattern of signals constituting a true consistent identifiable symbol encoding signal pattern when said scan pattern is in correct scanning relation to the symbol, and electrical means operatively connected to the signaling means and to the deflection means for joint control by the two latter means to detect deviation of the output pattern from said true signal pattern for the symbol under scan and responsively control angularly coordinate shifting of the scan pattern by the deflection means to correct such deviation.

References Cited in the file of this patent

UNITED STATES PATENTS

| | | |
|---|---|---|
| 1,470,696 | Nicolson | Oct. 16, 1923 |
| 2,474,177 | Wild | June 21, 1949 |
| 2,603,418 | Ferguson | July 15, 1952 |
| 2,640,984 | Sherwin | June 2, 1953 |
| 2,737,654 | Tasker et al. | Mar. 6, 1956 |
| 2,784,251 | Young et al. | Mar. 5, 1957 |
| 2,838,602 | Sprick | June 10, 1958 |

FOREIGN PATENTS

| | | |
|---|---|---|
| 624,089 | Great Britain | May 27, 1949 |
| 655,975 | Great Britain | Aug. 8, 1951 |

OTHER REFERENCES

Electronic Engineering, May 1948, pp. 139–143.